United States Patent
Zhu

(10) Patent No.: US 12,267,777 B2
(45) Date of Patent: Apr. 1, 2025

(54) TERMINAL WAKE-UP CONTROL METHOD, DEVICE AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 95 days.

(21) Appl. No.: 17/297,424

(22) PCT Filed: Nov. 27, 2018

(86) PCT No.: PCT/CN2018/117765
§ 371 (c)(1),
(2) Date: May 26, 2021

(87) PCT Pub. No.: WO2020/107235
PCT Pub. Date: Jun. 4, 2020

(65) Prior Publication Data
US 2021/0400581 A1 Dec. 23, 2021

(51) Int. Cl.
*H04W 52/02* (2009.01)

(52) U.S. Cl.
CPC ............................ *H04W 52/0229* (2013.01)

(58) Field of Classification Search
CPC ......... H04W 52/0229; H04W 52/0235; H04W 74/0808; H04W 72/0446; H04W 72/0453;
(Continued)

(56) References Cited

U.S. PATENT DOCUMENTS

| 10,004,000 B2 | 6/2018 | Li et al. |
| 2013/0155991 A1 | 6/2013 | Kazmi et al. |

(Continued)

FOREIGN PATENT DOCUMENTS

| CN | 104333873 A | 2/2015 |
| CN | 104581908 A | 4/2015 |

(Continued)

OTHER PUBLICATIONS

Ericsson "Introduction of enhancements for eMTC excluding EDT" 3GPP TSG-RAN2 Meeting #102 R2-1809253, Busan, Republic of Korea, May 21-25, 2018,(29p).

(Continued)

*Primary Examiner* — Marcos L Torres
(74) *Attorney, Agent, or Firm* — Arch & Lake LLP; Hao Tan; Shen Wang

(57) ABSTRACT

Provided is a terminal wakeup control method, belonging to the technical field of wireless communication. The method includes that: a base station monitors a channel state of an unlicensed band; the unlicensed band is occupied according to a monitoring result of the channel state of the unlicensed band; and a wakeup signal is sent to a terminal through the unlicensed band at a plurality of first-time points in a band occupation time period. When the base station supports the unlicensed band, the base station, after successfully occupying the unlicensed band, sends the wakeup signal to the terminal through the unlicensed band at the plurality of first-time points in the present time period during which the unlicensed band is occupied.

10 Claims, 19 Drawing Sheets

(58) Field of Classification Search
CPC . H04L 5/0091; H04L 27/0006; H04L 1/0018; H04L 5/0053; Y02D 30/70

See application file for complete search history.

(56) References Cited

U.S. PATENT DOCUMENTS

| | | | |
|---|---|---|---|
| 2015/0327297 A1 | 11/2015 | Nilsson et al. | |
| 2016/0056935 A1 | 2/2016 | Damnjanovic et al. | |
| 2016/0165604 A1 | 6/2016 | Khawer et al. | |
| 2016/0309367 A1 | 10/2016 | Li et al. | |
| 2017/0048919 A1 | 2/2017 | Gaal et al. | |
| 2017/0339641 A1 | 11/2017 | Nigam et al. | |
| 2017/0359849 A1 | 12/2017 | Zhang et al. | |
| 2021/0266837 A1* | 8/2021 | Chen | H04W 24/10 |
| 2021/0352582 A1* | 11/2021 | Zeng | H04W 72/0446 |

FOREIGN PATENT DOCUMENTS

| | | |
|---|---|---|
| CN | 104812032 A | 7/2015 |
| CN | 105052096 A | 11/2015 |
| CN | 105636090 A | 6/2016 |
| CN | 106255206 A | 12/2016 |
| CN | 108282865 A | 7/2018 |
| EP | 2757850 A1 | 7/2014 |
| WO | 2015199352 A1 | 12/2015 |
| WO | 2016072778 A1 | 5/2016 |
| WO | 2016119281 A1 | 8/2016 |
| WO | 2016161708 A1 | 10/2016 |
| WO | 2018188933 A1 | 10/2018 |

OTHER PUBLICATIONS

Huawei, HiSilicon "Introduction of further NB-IoT enhancements other than EDT in TS 36.300" 3GPP TSG-RAN2 Meeting #102 R2-1807879, Busan, Korea, May 21-25, 2018, (10p).

Office Action of the Indian Application No. 202147025079, issued on Mar. 23, 2022 with partial English translation, (5p).

Supplementary European Search Report in the European Application No. 18941626.6 dated May 19, 2022, (9p).

English translation of the Written Opinion of the International Search Authority in the International Application No. PCT/CN2018/117765, mailed on Jun. 14, 2019, (4p).

International Search Report of PCT Application No. PCT/CN2018/117765 dated Jun. 14, 2019 with English translation,(4p).

3GPP TSG RAN WG1 Meeting #92bis R1-1804829, Qualcomm Incorporated, "TxOP Frame Structure for NR unlicensed", Sanya, China, Apr. 16-Apr. 20, 2018.

3GPP TSG-RAN WG2 Meeting#102 R2-1807667 Revision of R2-1805955, ZTE Corporation, "Remaining issues on wake-up signal", Busan, Korea, May 21-25, 2018.

3GPP TSG RAN WG1 Meeting #95 R1-1813410, Qualcomm Incorporated, "TxOP Frame Structure for NR unlicensed", Spokane, USA, Nov. 12-Nov. 16, 2018.

* cited by examiner

| A wakeup signal sent by a base station is received on an unlicensed band, the wakeup signal being a signal sent by the base station at at least two first-time points in a band occupation time period after occupying the unlicensed band, and transmission structure indication information sent by the base station at at least two second-time points in the band occupation time period is received on the unlicensed band | 901 |

| After the wakeup signal is received, downlink control signaling or downlink data is monitored, and after the transmission structure indication information is received, the downlink control signaling or downlink data sent by the base station is received in a time-domain interval corresponding to downlink transmission of the base station according to a transmission structure indicated by the transmission structure indication information | 902 |

FIG. 9

TERMINAL WAKE-UP CONTROL METHOD, DEVICE AND STORAGE MEDIUM

CROSS-REFERENCE TO RELATED APPLICATION

This application is the U.S. national stage of International Patent Application No. PCT/CN2018/117765 filed on Nov. 27, 2018, the entire content of which is incorporated herein by reference for all purposes.

TECHNICAL FIELD

The present disclosure generally relates to the technical field of wireless communication, and more particularly, to a terminal wakeup control method and device and a storage medium.

BACKGROUND

For satisfying communication requirements brought by increased mobile data, it is proposed in the industry to extend cellular mobile communication to an unlicensed band such that the cellular mobile communication technology can meet a regulatory requirement of unlicensed bands.

For saving power of a terminal, the terminal may enter a sleep state when there is no data transmission. When receiving a wakeup signal from a base station (STA), the terminal may start listening a Physical Downlink Control Channel (PDCCH) to determine whether the terminal is required to enter an active state or not. In related art, a base station may send a wakeup signal to a terminal through downlink data at a starting time of each time period during which an unlicensed band is occupied. For a certain terminal, when there is no downlink data sent to the terminal at a starting time of a certain time period during which a base station successfully occupies an unlicensed band but there is downlink data arriving at the terminal in a present time period during which the unlicensed band is occupied, since the terminal cannot detect any wakeup signal in the present time period during which the unlicensed band is occupied, the downlink data may be received only in a time period during which the base station occupies the unlicensed band next time, resulting in higher transmission latency.

SUMMARY

The present disclosure provides a wakeup control method and device and a storage medium. The technical solutions are implemented as follows.

According to a first aspect of the present disclosure, a wakeup control method is provided, which may include that:
- a channel state of an unlicensed band is monitored, the channel state including an idle state or an occupied state;
- the unlicensed band is occupied according to a monitoring result of the channel state of the unlicensed band; and
- a wakeup signal is sent to a terminal through the unlicensed band at a plurality of first-time points in a band occupation time period, the band occupation time period being a present time period during which the unlicensed band is occupied and the wakeup signal being configured to trigger the terminal to monitor downlink control signaling or downlink data on the unlicensed band.

According to a second aspect of the present disclosure, a terminal wakeup control method is provided, which may be implemented by a terminal and include that:
- a wakeup signal sent by a base station is received on an unlicensed band, the wakeup signal being a signal sent by the base station at a plurality of first-time points in a band occupation time period after occupying the unlicensed band and the band occupation time period being a present time period during which the base station occupies the unlicensed band; and
- after the wakeup signal is received, downlink control signaling or downlink data is monitored.

According to a third aspect of the present disclosure, a terminal wakeup control device is provided, which may be implemented by a base station and include:
- a channel monitoring module, configured to monitor a channel state of an unlicensed band, the channel state including an idle state or an occupied state;
- a band occupation module, configured to occupy the unlicensed band according to a monitoring result of the channel state of the unlicensed band; and
- a wakeup signal sending module, configured to send a wakeup signal to a terminal through the unlicensed band at a plurality of first-time points in a band occupation time period, the band occupation time period being a present time period during which the unlicensed band is occupied and the wakeup signal being configured to trigger the terminal to monitor downlink control signaling or downlink data on the unlicensed band.

According to a fourth aspect of the present disclosure, a terminal wakeup control device is provided, which may be implemented by a terminal and include:
- a wakeup signal receiving module, configured to receive a wakeup signal from a base station on an unlicensed band, the wakeup signal being a signal sent by the base station at a plurality of first-time points in a band occupation time period after occupying the unlicensed band and the band occupation time period being a present time period during which the base station occupies the unlicensed band; and
- a channel monitoring module, configured to, after the wakeup signal is received, monitor downlink control signaling or downlink data.

According to a fifth aspect of the present disclosure, a terminal wakeup control system is provided, which may include a terminal and a base station, wherein
- the base station may include the terminal wakeup control device as described in the third aspect; and
- the terminal may include the terminal wakeup control device as described in the fourth aspect.

According to a sixth aspect of the present disclosure, a terminal wakeup control device is provided, which may be implemented by a base station and include:
- a processor; and
- a memory configured to store instructions executable by the processor,
- wherein the processor may be configured to:
- monitor a channel state of an unlicensed band, the channel state including an idle state or an occupied state;
- occupy the unlicensed band according to a monitoring result of the channel state of the unlicensed band; and
- send a wakeup signal to a terminal through the unlicensed band at a plurality of first-time points in a band occupation time period, the band occupation time period being a present time period during which the unlicensed band is occupied and the wakeup signal being configured to trigger the terminal to monitor downlink control signaling or downlink data on the unlicensed band.

According to a seventh aspect of the present disclosure, a terminal wakeup control device is provided, which may be implemented by a terminal and include:

a processor; and a memory configured to store instructions executable by the processor, wherein the processor may be configured to:

receive a wakeup signal from a base station on an unlicensed band, the wakeup signal being a signal sent by the base station at a plurality of first-time points in a band occupation time period after occupying the unlicensed band and the band occupation time period being a present time period during which the base station occupies the unlicensed band; and after the wakeup signal is received, monitor downlink control signaling or downlink data.

According to an eighth aspect of the present disclosure, a computer-readable storage medium is provided, which may include executable instructions, wherein a processor in a terminal may call the executable instructions to implement the terminal wakeup control method as described in the first aspect or any optional implementation of the first aspect.

According to a ninth aspect of the present disclosure, a computer-readable storage medium is provided, which may include executable instructions, wherein a processor in a base station may call the executable instructions to implement the terminal wakeup control method as described in the second aspect or any optional implementation of the second aspect.

When a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service can be sent to the terminal only after the unlicensed band is successfully occupied next time is reduced, and furthermore, data transmission latency of the terminal is shortened.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 9 is a flowchart of a terminal wakeup control method according to an exemplary embodiment.

DETAILED DESCRIPTION

Figure 1:
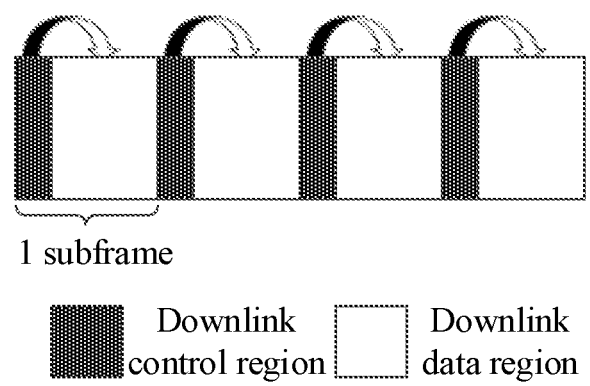
FIG. 1 is a schematic diagram of Long Term Evolution (LTE) dynamic scheduling.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

It is to be understood that "a plurality of" mentioned herein refers to two or more and "multiple" refers to two or more than two. The "and/or" is an association relationship for describing associated objects and represents that three relationships may exist. For example, A and/or B may represent the following three cases: only A exists, both A and B exist, and only B exists. The character "/" generally indicates that the related objects are in an "or" relationship.

Radio spectrum resource is a limited non-renewable natural resource, so that specialized management organizations are set up and special policies and regulations are released in each country for radio spectra to implement unified planning and management of the radio spectra. A fixed spectrum allocation strategy is adopted mostly for spectrum management in each country, namely spectrum resources are managed by a responsible government department and allocated to fixed authorized users, so that excessive interferences between users may be avoided and the spectrum resources may be utilized better. A licensed spectrum is strictly restricted and protected and only allows authorized users and a compliant device thereof to access, and the accessing users are usually required to pay. There are licensed spectra for important sectors such as public safety, railways, civil aviation, broadcasting and television and telecommunications. Communications of devices in these sectors may be carried out on the licensed spectra. Particularly in the telecommunication industry, communications of mobile phones used every day may be carried out through licensed spectra possessed by operating companies, and each major operating company may possess a dedicated band licensed by a radio management unit or department of a corresponding country to prevent mobile communications of the public from interference.

An unlicensed spectrum is a spectrum accessible and available for all devices meeting certain specifications and standards without interference to other users. Typically, transmission may be implemented through unlicensed spectra in communication technologies such as Wireless Fidelity (Wi-Fi) and Bluetooth (BT). In addition, the International Telecommunication Union-Radio Communication Sector once defined the Industrial Scientific Medical (ISM) band. This band is mainly available for three types of institutes, i.e., industrial, scientific and medical institutes without any authorization grant. Certain transmit power is needed to be kept and interference to other bands is required to be avoided.

With the constant emergence of novel Internet applications of new-generation Augmented Reality (AR)/Virtual Reality (VR), vehicle-to-vehicle communication and the like, higher requirements have been raised for wireless communication technologies, which promotes constant evolution of the wireless communication technologies to meet the requirements of applications. A cellular mobile communication technology is in an evolution stage of a new-generation technology. An important characteristic of the new-generation technology is that flexible configuration of multiple service types is supported. Different service types have different requirements on a wireless communication technology. For example, a main requirement of an enhanced Mobile Broad Band (eMBB) service type focuses on the aspects of great bandwidth, high rate and the like, a main requirement of an Ultra Reliable Low Latency Communication (URLLC) service type focuses on the aspects of relatively high reliability and low latency, and a main requirement of a massive Machine Type Communication (mMTC) service type focuses on a large number of connections. Therefore, a new-generation wireless communication system requires a flexible and configurable design to support transmission of multiple service types.

Under the driving of service requirements, single use of a licensed spectrum cannot meet the service requirements, so deployment of a mobile network on an unlicensed spectrum is considered. Researches on extension of cellular mobile communication technologies to unlicensed bands have been carried out in the industry. For example, for extending a Fifth-Generation (5G) technology, also called a New Radio (NR) technology, to an unlicensed band, the 3rd Generation Partnership Project (3GPP) passed a 5G research project "Study on NR-based Access to Unlicensed Spectrum", called NR-U for short, to ensure that, through researches of the project, NR can meet regulatory requirements of an unlicensed band and can coexist peacefully with other access technologies working on the unlicensed band.

In a system design in LTE, uplink and downlink transmission of a terminal is based on scheduling of a base station. The base station may send downlink or uplink scheduling signaling to instruct the terminal to receive or send data at a corresponding resource position through a notification. For dynamic scheduling, a piece of scheduling signaling may instruct transmission on only one transmission unit (for example, subframe). For example, referring to FIG. 1, a schematic diagram of LTE dynamic scheduling is shown. As shown in FIG. 1, in downlink transmission, a transmission unit is a subframe, and a downlink control region in each subframe is used to schedule a downlink data region in the subframe.

In addition, the battery life of a terminal is an important factor impacting the performance of the terminal. An overhead of the terminal in control signaling detection is important to power consumption of the terminal. In many cases, when the terminal does not require service interaction, a base station has no control signaling to be sent to the terminal. Correspondingly, the terminal cannot detect any control signaling during control signaling detection, wasting power greatly. In systems in LTE, NR and the like, for reducing a detection overhead of a terminal, a sleep state of the terminal is defined, and the terminal may enter the sleep state when there is no data interaction so as to avoid control signaling detection and reduce energy consumption.

Figure 2:
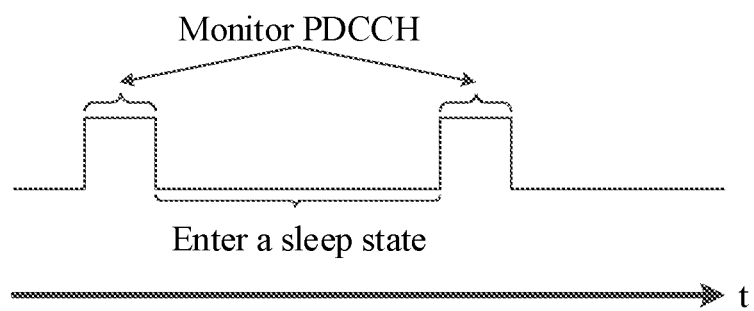
FIG. 2 is a schematic diagram of channel monitoring.

In related art, when a terminal is in a sleep state, the terminal is required to periodically monitor downlink control signaling or downlink data, for example, monitoring a paging signal in a PDCCH, based on a configuration of a base station to determine whether the terminal is required to enter an active state or not. Referring to FIG. 2, a schematic diagram of channel monitoring is shown. As shown in FIG. 2, for monitoring downlink control signaling or downlink data, a terminal is required to keep monitoring for a period of time in an interval of entering a sleep state twice, which may consume energy of the terminal.

In another implementation, a base station may send a wakeup signal to a terminal before a moment at which the terminal is configured to detect paging information to indicate whether there is paging information for the terminal or not. In response to receiving the wakeup signal, the terminal may presently start monitoring downlink control signaling or downlink data. In a case that the terminal does not receive a wakeup signal, the terminal may not monitor downlink control signaling or downlink data to save power of the terminal.

It is required in regulations of many countries that technologies of radio access over unlicensed bands follow a Listen Before Talk (LBT) mechanism and cellular mobile communication technologies are also required to follow the LBT mechanism when intending to work on unlicensed bands normally. Therefore, in a process of performing data transmission on an unlicensed band based on a cellular mobile communication technology, a base station may communicate with a terminal only after successfully occupying an unlicensed band, which restricts an opportunity of sending a wakeup signal to the terminal by the base station. In related art, in a process of using an unlicensed band based on a cellular mobile communication technology, a base station may send a wakeup signal at a time-domain position before the starting of a Paging Occasion (PO) in a paging radio frame. For some terminals requiring service transmission only after a wakeup signal is sent, since no wakeup signal before the starting of the PO is detected, the terminals may consider that there is no service to be transmitted and do not detect control information such as paging information, increasing data transmission latency.

Figure 3:
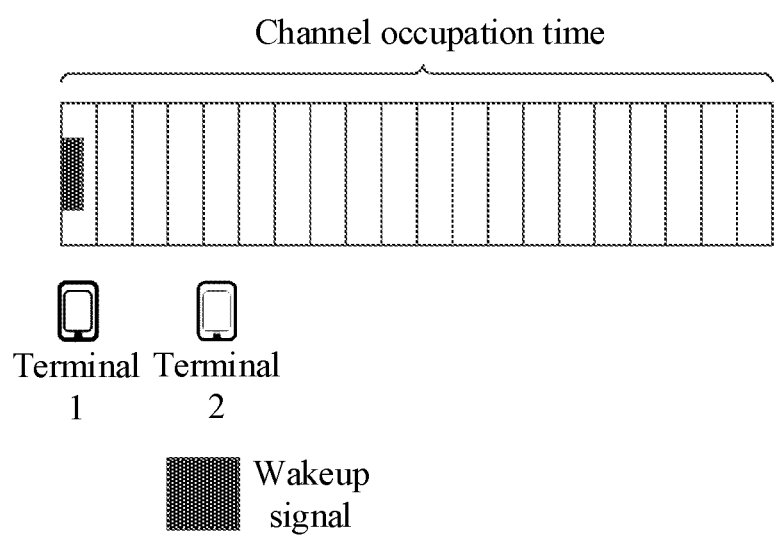
FIG. 3 is a schematic diagram of sending of a wakeup signal.

For example, referring to FIG. 3, a schematic diagram of sending of a wakeup signal involved in the embodiment of the present disclosure is shown. As shown in FIG. 3, a base station may send a wakeup signal after occupying an unlicensed band, and a terminal 1, after receiving the wakeup signal, may start detecting a PDCCH and receive control information or data information. However, in related art, the wakeup signal is sent only at a starting moment in an occupation time range on the unlicensed band. Therefore, a terminal 2 that does not monitor a wakeup signal can perform data interaction only in next band occupation time, bringing data transmission latency.

According to the solutions provided in the embodiments of the present disclosure, a terminal wakeup control method applied to an unlicensed band is provided. There are many opportunities for a base station to wake up a terminal in a time period during which the unlicensed band is occupied, so that data transmission latency is shortened.

The embodiments of the present disclosure provide a terminal wakeup control solution, which may be implemented by a cellular mobile communication technology-based wireless communication system to implement paging for a terminal by a base station.

Figure 4:
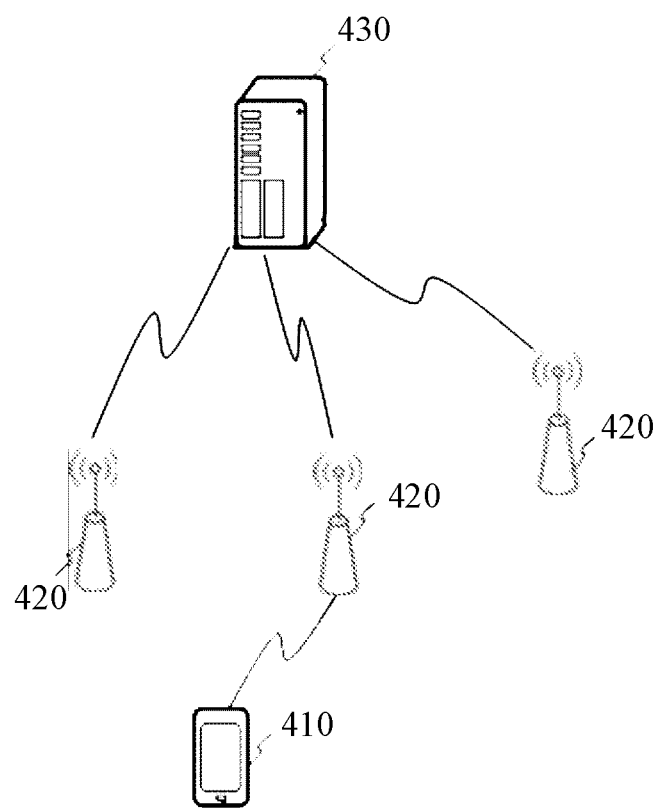
FIG. 4 is a structure diagram of a wireless communication system according to part of exemplary embodiments.

FIG. 4 is a structure diagram of a wireless communication system according to part of exemplary embodiments. As shown in FIG. 4, the mobile communication system is a cellular mobile communication technology-based communication system. The mobile communication system may include a plurality of terminals 410 and a plurality of base stations 420.

The terminal 410 may refer to a device providing voice and/or data connectivity for a user. The terminal 410 may communicate with one or more core networks through a Radio Access Network (RAN). The terminal 410 may be an Internet of things terminal, for example, a sensor device, a mobile phone (or called a "cell" phone) and a computer with an Internet of things terminal, and for example, may be a fixed, portable, pocket-sized, handheld, computer-embedded or vehicle-mounted device, for example, an STA, a subscriber unit, a subscriber STA, a mobile STA, a mobile, a remote STA, an access point, a remote terminal, an access terminal, a user terminal, a user agent, a user device or User Equipment (UE). Or, the terminal 410 may also be a device of an unmanned aerial vehicle.

The base station 420 may be a network-side device in the wireless communication system. The wireless communication system may be a 4th Generation mobile communication (4G) system, also called an LTE system. Or, the wireless communication system may also be a 5G system, also called an NR system. Or, the wireless communication system may also be a next-generation system of the 5G system, The base station 420 may be an Evolved Node B (eNB) in the 4G system. Or, the base station 420 may also be a gNB adopting a central distributed architecture in the 5G system. The base station 420, when adopting the central distributed architecture, usually includes a Central Unit (CU) and a plurality of Distributed Units (DUs). Protocol stacks of a Packet Data Convergence Protocol (PDCP) layer, a Radio Link Control (RLC) layer and a Media Access Control (MAC) layer may be arranged in the CU. A protocol stack of a Physical (PHY) layer may be arranged in the DU. A specific implementation manner of the base station 420 is not limited in the embodiment of the present disclosure.

The base station 420 may establish a wireless connection with the terminal 410 through a radio interface. In different implementations, the radio interface may be a 4G-standard-based radio interface; or, the radio interface may be a 5G-standard-based radio interface, for example, the radio interface may be an NR interface; or, the radio interface may also be a radio interface based on a next-generation mobile communication network technology standard of 5G.

Optionally, the wireless communication system may further include a network management device 430.

The plurality of base stations 420 may be connected with the network management device 430 respectively. The network management device 430 may be a core network device in the wireless communication system. For example, the network management device 430 may be a Mobility Management Entity (MME) in an Evolved Packet Core (EPC). Or, the network management device may also be another core network device, for example, a Serving GateWay (SGW), a Public Data Network GateWay (PGW), a Policy and Charging Rules Function (PCRF) or a Home Subscriber Server (HSS). An implementation form of the network management device 430 is not limited in the embodiment of the present disclosure.

Figure 5:
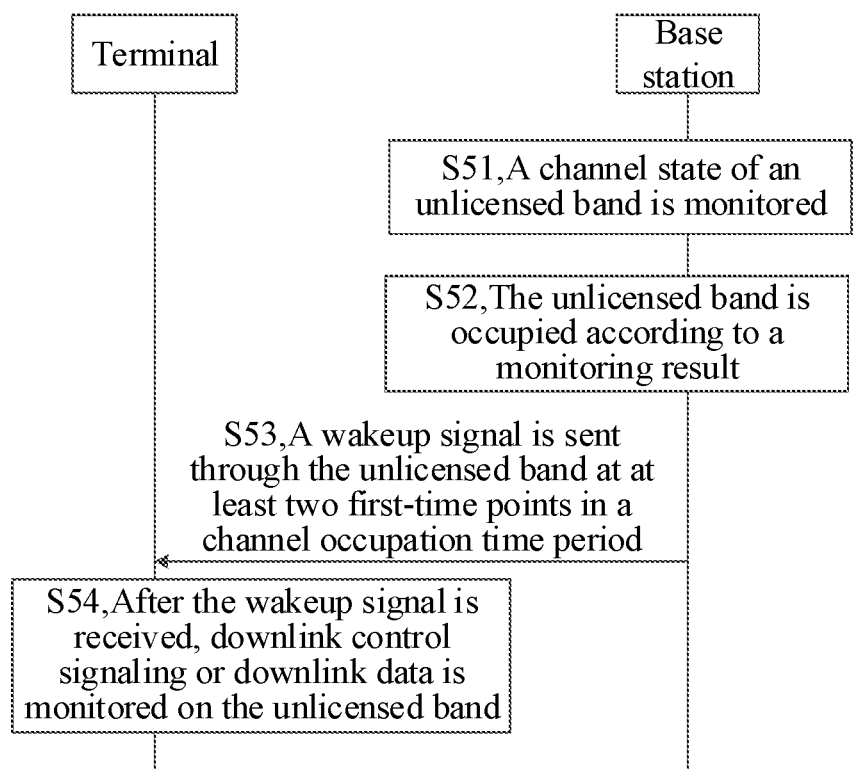
FIG. 5 is a flowchart of terminal wakeup control according to an exemplary embodiment.

When data transmission is performed between the terminal and the base station based on an unlicensed band, there may be many opportunities for the base station to wake up the terminal in a process of occupying the unlicensed band. For example, referring to FIG. 5, a flowchart of terminal wakeup control according to an exemplary embodiment is shown. As shown in FIG. 5, the terminal wakeup control flow may be as follows.

In Step 51, a base station monitors a channel state of an unlicensed band, the channel state including an idle state or an occupied state.

In Step 52, the base station occupies the unlicensed band according to a monitoring result of the channel state of the unlicensed band.

In Step 53, the base station sends a wakeup signal to a terminal through the unlicensed band at a plurality of first-time points in a band occupation time period, and correspondingly, the terminal receives the wakeup signal from the base station on the unlicensed band.

The band occupation time period is a present time period during which the unlicensed band is occupied, and the wakeup signal is configured to trigger the terminal to monitor downlink control signaling or downlink data on the unlicensed band.

In Step 54, the terminal receives the wakeup signal from the base station on the unlicensed band, and after receiving the wakeup signal, monitors the downlink control signaling or the downlink data on the unlicensed band.

In the embodiment of the present disclosure, when a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service may be sent to the terminal only after the unlicensed band is successfully occupied next time is reduced, and furthermore, data transmission latency of the terminal is shortened.

Figure 6:
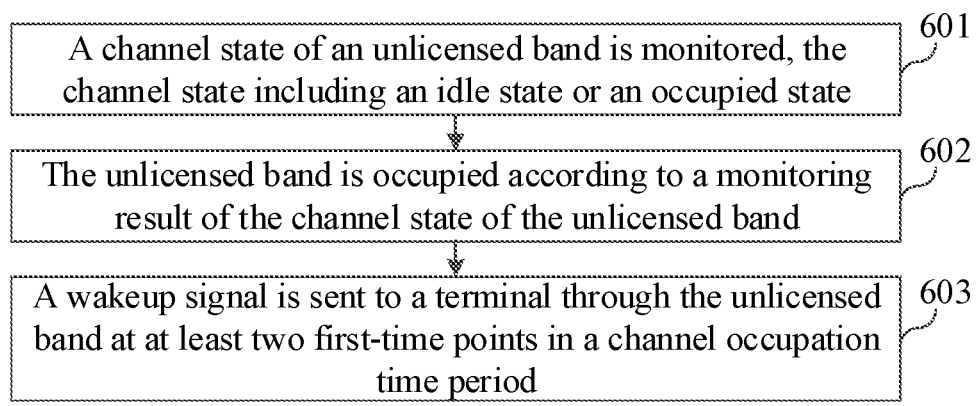
FIG. 6 is a flowchart of a terminal wakeup control method according to an exemplary embodiment.

FIG. 6 is a flowchart of a terminal wakeup control method according to an exemplary embodiment. As shown in FIG. 6, the terminal wakeup control method is applied to the wireless communication system shown in FIG. 4 and implemented by the base station 420 in FIG. 4. The method may include the following steps.

In Step 601, a channel state of an unlicensed band is monitored, the channel state including an idle state or an occupied state.

In Step 602, the unlicensed band is occupied according to a monitoring result of the channel state of the unlicensed band.

In Step 603, a wakeup signal is sent to a terminal through the unlicensed band at a plurality of first-time points in a band occupation time period, the band occupation time period being a present time period during which the base station occupies the unlicensed band and the wakeup signal being configured to trigger the terminal to monitor downlink control signaling or downlink data on the unlicensed band.

Optionally, the operation that the wakeup signal is sent to the terminal through the unlicensed band at the plurality of first-time points in the band occupation time period may include that:

a first cycle is acquired; and the wakeup signal is sent to the terminal through the unlicensed band at the plurality of first-time points in the band occupation time period according to the first cycle.

Optionally, the operation that the first cycle is acquired may include that:

the first cycle that is preset is acquired; or, the first cycle is acquired according to a preset first-cycle determination rule.

Optionally, the first-cycle determination rule may include a mapping rule between a length of the band occupation time period and the first cycle.

The operation that the first cycle is acquired according to the preset first-cycle determination rule may include that:

the first cycle is acquired based on the length of the band occupation time period and the mapping rule between the length of the band occupation time period and the first cycle.

Optionally, the method further may include that:

first-cycle indication information is sent to the terminal, the first-cycle indication information including the first cycle, or, the first-cycle indication information including the first-cycle determination rule and the first-cycle determination rule being configured to acquire the first cycle.

Optionally, the first-cycle determination rule may include a mapping rule between a length of the band occupation time period and the first cycle.

When the first-cycle indication information includes the first-cycle determination rule, the method further may include that:

the length of the band occupation time period is sent to the terminal through the unlicensed band in the band occupation time period.

From the above, according to the solution in the embodiment of the present disclosure, when a base station supports working on an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service may be sent to the terminal only after the unlicensed band is successfully occupied next time is reduced, and furthermore, data transmission latency of the terminal is shortened.

Figure 7:
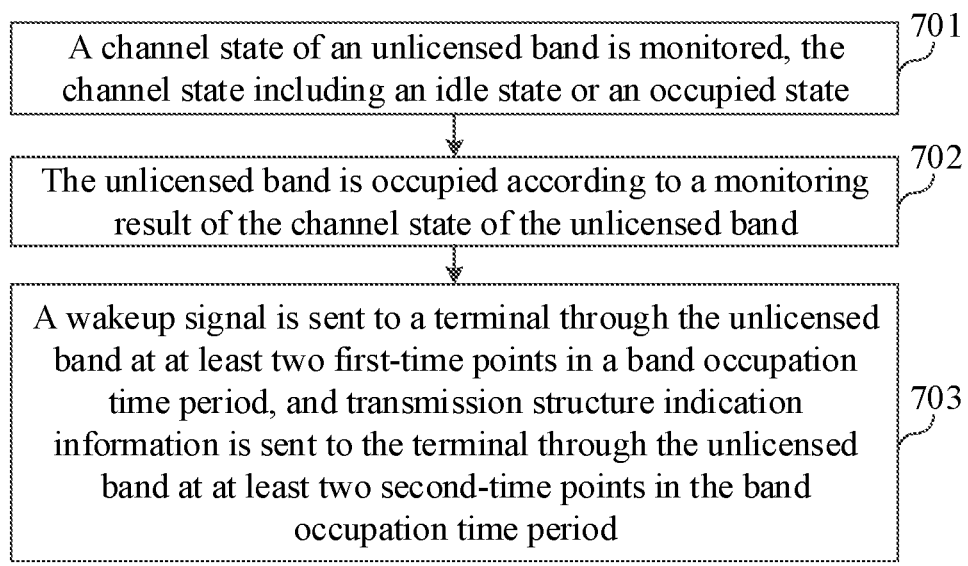
FIG. 7 is a flowchart of a terminal wakeup control method according to an exemplary embodiment.

FIG. 7 is a flowchart of a terminal wakeup control method according to an exemplary embodiment. As shown in FIG. 7, the terminal wakeup control method is applied to the wireless communication system shown in FIG. 4 and implemented by the base station 420 in FIG. 4. The method may include the following steps.

In Step 701, a channel state of an unlicensed band is monitored, the channel state including an idle state or an occupied state.

In Step 702, the unlicensed band is occupied according to a monitoring result of the channel state of the unlicensed band.

In Step 703, a wakeup signal is sent to a terminal through the unlicensed band at a plurality of first-time points in a band occupation time period, and transmission structure indication information is sent to the terminal through the unlicensed band at a plurality of second-time points in the band occupation time period.

The band occupation time period is a present time period during which the base station occupies the unlicensed band, and the wakeup signal is configured to trigger the terminal to monitor downlink control signaling or downlink data sent by the base station on the unlicensed band. The transmission structure indication information is configured to indicate a transmission structure adopted for transmission on the unlicensed band.

The wakeup signal may be sent according to a first cycle. An acquisition manner for the first cycle and a manner for indicating the first cycle to the terminal may refer to the descriptions in the embodiment shown in FIG. 6 and will not be elaborated herein.

Optionally, the transmission structure indication information is configured to indicate a target transmission structure in a preset transmission structure set, and the target transmission structure is at least one transmission structure in the transmission structure set;

or, the transmission structure indication information is configured to indicate the target transmission structure in a target transmission structure set, the target transmission structure set is one set in a plurality of preset transmission structure sets, and the target transmission structure is at least one transmission structure in the target transmission structure set.

Optionally, the operation that the transmission structure indication information is sent to the terminal through the unlicensed band at the plurality of second-time points in the band occupation time period may include that:

a second cycle is acquired; and in the band occupation time period, the transmission structure indication information is sent to the terminal at least twice on the unlicensed band according to the second cycle.

Optionally, the operation that the second cycle is acquired may include that:

the second cycle that is preset is acquired; or, the second cycle is acquired according to a preset second-cycle determination rule.

Optionally, the second-cycle determination rule may include a mapping rule between a length of the band occupation time period and the second cycle.

The operation that the second cycle is acquired according to the preset second-cycle determination rule may include that:

the second cycle is acquired based on the length of the band occupation time period and the mapping rule between the length of the band occupation time period and the second cycle.

Optionally, the method further may include that:

second-cycle indication information is sent to the terminal, the second-cycle indication information including the second cycle, or, the second-cycle indication information including the second-cycle determination rule and the second-cycle determination rule being configured to acquire the second cycle.

Optionally, the second-cycle determination rule may include a mapping rule between a length of the band occupation time period and the second cycle.

When the second-cycle indication information includes the second-cycle determination rule, the method further may include that:

the length of the band occupation time period is sent to the terminal through the unlicensed band in the band occupation time period.

Optionally, the first cycle is the same as the second cycle; or, the first cycle is different from the second cycle.

Optionally, when the first cycle is the same as the second cycle, a resource spacing between the wakeup signal and the transmission structure indication information may be a specified resource spacing.

From the above, according to the solution in the embodiment of the present disclosure, when a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service can be sent to the terminal only after the unlicensed band is successfully occupied next time is reduced, and furthermore, data transmission latency of the terminal is shortened.

In addition, in the solution in the embodiment of the present disclosure, the base station, after successfully occupying the unlicensed band, may send transmission structure indication information to the terminal through the unlicensed band at the plurality of second-time points in the present time period during which the unlicensed band is occupied to indicate a time-domain interval corresponding to downlink transmission of the base station such that the terminal can receive signaling or data from the base station in the time-domain interval corresponding to downlink transmission from the base station based on the transmission structure indication information. Therefore, the power consumption of the terminal is further reduced, and power of the terminal is saved.

Figure 8:
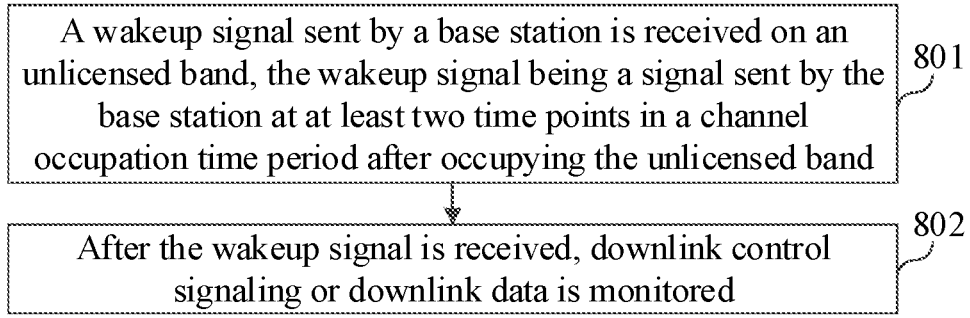
FIG. 8 is a flowchart of a terminal wakeup control method according to an exemplary embodiment.

FIG. 8 is a flowchart of a terminal wakeup control method according to an exemplary embodiment. As shown in FIG. 8, the terminal wakeup control method is applied to the wireless communication system shown in FIG. 4 and implemented by the terminal 410 in FIG. 4. The method may include the following steps.

In Step 801, a wakeup signal sent by a base station is received on an unlicensed band, the wakeup signal being a signal sent by the base station at a plurality of first-time points in a band occupation time period after occupying the unlicensed band and the band occupation time period being a present time period during which the base station occupies the unlicensed band.

In Step 802, after the wakeup signal is received, downlink control signaling or downlink data is monitored.

Optionally, the operation that the wakeup signal sent by the base station is received on the unlicensed band may include that:

a first cycle is acquired; and
the wakeup signal sent by the base station is received on the unlicensed band according to the first cycle.

Optionally, the operation that the first cycle is acquired may include that:

the preset first cycle is acquired; or,
the first cycle is acquired according to a preset first-cycle determination rule.

Optionally, the first-cycle determination rule may include a mapping rule between a length of the band occupation time period and the first cycle. The operation that the first cycle is acquired according to the preset first-cycle determination rule may include that:

the length, sent by the base station through the unlicensed band in the band occupation time period, of the band occupation time period is received, and
the first cycle is acquired based on the length of the band occupation time period and the mapping rule between the length of the band occupation time period and the first cycle.

Optionally, before the operation that the first cycle is acquired, the method further may include that:

first-cycle indication information sent by the base station is received, the first-cycle indication information including the first cycle, or, the first-cycle indication information including the first-cycle determination rule and the first-cycle determination rule being configured to acquire the first cycle.

From the above, according to the solution in the embodiment of the present disclosure, when a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service can be sent to the terminal only after the unlicensed band is successfully occupied next time is reduced, and furthermore, data transmission latency of the terminal is shortened.

FIG. 9 is a flowchart of a terminal wakeup control method according to an exemplary embodiment. As shown in FIG. 9, the terminal wakeup control method is applied to the wireless communication system shown in FIG. 4 and implemented by the terminal 410 in FIG. 4. The method may include the following steps.

In Step 901, a wakeup signal sent by a base station is received on an unlicensed band, the wakeup signal being a signal sent by the base station at a plurality of first-time points in a band occupation time period after occupying the unlicensed band, and transmission structure indication information sent by the base station at a plurality of second-time points in the band occupation time period is received on the unlicensed band.

The band occupation time period is a present time period during which the base station occupies the unlicensed band. The transmission structure indication information is configured to indicate a transmission structure adopted for transmission on the unlicensed band.

In Step 902, after the wakeup signal is received, downlink control signaling or downlink data is monitored, and after the transmission structure indication information is received, the downlink control signaling or downlink data sent by the base station is received in a time-domain interval corresponding to downlink transmission from the base station based on the transmission structure indicated by the transmission structure indication information.

The wakeup signal may be received according to a first cycle. An acquisition manner for the first cycle may refer to the descriptions in the embodiment shown in FIG. 6 and will not be elaborated herein.

Optionally, the operation that the transmission structure indication information sent by the base station at the plurality of second-time points in the band occupation time period is received on the unlicensed band may include that:

a second cycle is acquired; and the transmission structure indication information sent by the base station is received on the unlicensed band according to the second cycle.

Optionally, the operation that the second cycle is acquired may include that:

the second cycle that is preset is acquired; or, the second cycle is acquired according to a preset second-cycle determination rule.

Optionally, the second-cycle determination rule includes a mapping rule between a length of the band occupation time period and the second cycle; and the operation that the second cycle is acquired according to the preset second-cycle determination rule may include that:

the length, sent by the base station through the unlicensed band in the band occupation time period, of the band occupation time period is received, and the second cycle is acquired based on the length of the band occupation time period and the mapping rule between the length of the band occupation time period and the second cycle.

Optionally, before the operation that the second cycle is acquired, the method further may include that:

second-cycle indication information sent by the base station is received, the second-cycle indication information including the second cycle, or, the second-cycle indication information including the second-cycle determination rule and the second-cycle determination rule being configured to acquire the second cycle.

Optionally, the first cycle is the same as the second cycle; or, the first cycle is different from the second cycle.

Optionally, when the first cycle is the same as the second cycle, a resource spacing between the wakeup signal and the transmission structure indication information may be a specified resource spacing.

The operation that the transmission structure indication information sent by the base station at the plurality of second-time points in the band occupation time period is received on the unlicensed band may include that:

when the wakeup signal is received, the transmission structure indication information is received on the unlicensed band based on a resource position of the wakeup signal and the specified resource spacing.

From the above, according to the solution in the embodiment of the present disclosure, when a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service can be sent to the terminal only after the unlicensed band is successfully occupied next time is reduced, and furthermore, data transmission latency of the terminal is shortened.

In addition, in the solution in the embodiment of the present disclosure, the base station, after successfully occupying the unlicensed band, may send transmission structure indication information to the terminal through the unlicensed band at the plurality of second-time points in the present time period during which the unlicensed band is occupied to indicate a time-domain interval corresponding to downlink transmission from the base station, such that the terminal receives signaling or data from the base station in the time-domain interval corresponding to downlink transmission from the base station based on the transmission structure indication information. Therefore, the power consumption of the terminal is further reduced, and power of the terminal is saved.

Figure 10:
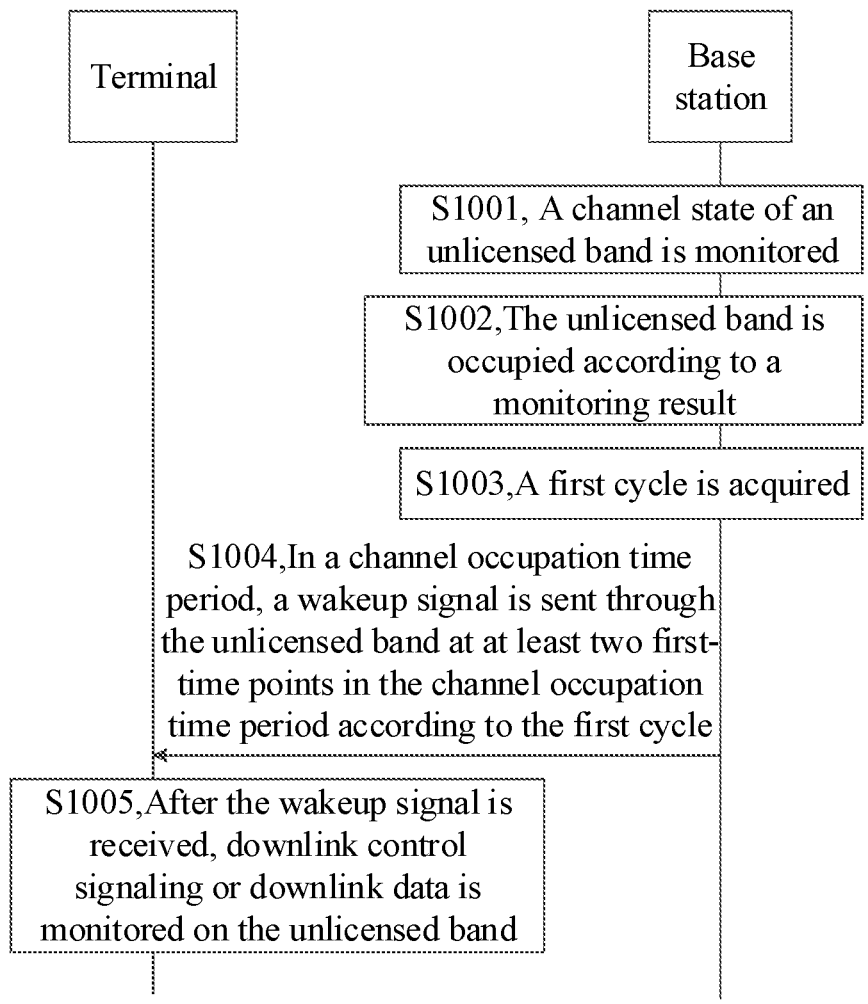
FIG. 10 is a flowchart of a terminal wakeup control method according to an exemplary embodiment.

FIG. 10 is a flowchart of a terminal wakeup control method according to an exemplary embodiment. As shown in FIG. 10, the terminal wakeup control method is applied to the wireless communication system shown in FIG. 4. The method may include the following steps.

In Step 1001, a base station monitors a channel state of an unlicensed band, the channel state including an idle state or an occupied state.

In a possible implementation, the base station may detect signal energy (or signal strength) on the unlicensed band. When detecting that the signal energy on the unlicensed band is lower than an energy threshold in a continuous period of time (for example, continuous 4us), the base station may consider that the unlicensed band is presently in the idle state, otherwise may consider that the unlicensed band is in the occupied state.

In Step 1002, the base station occupies the unlicensed band according to a monitoring result indicating that the unlicensed band is in the idle state.

For example, when the base station detects that an unlicensed band is presently in an idle state, the unlicensed band may be occupied. Correspondingly, when the base station detects that an unlicensed band is presently in an occupied state, the unlicensed band is not occupied and a channel state of the unlicensed band is continued to be monitored.

In Step 1003, the base station acquires a first cycle.

When the first cycle is acquired, the base station may acquire the first cycle that is preset.

In a possible implementation, the first cycle configured to send a wakeup signal on the unlicensed band may be preset in the base station. A length of the first cycle may be a fixed length. Moreover, the length of the first cycle may be set by the system in a unified manner, or, the length of the first cycle may also be set by the base station.

Or, when the first cycle is acquired, the base station may also acquire the first cycle according to a preset first-cycle determination rule.

In another possible implementation, the first cycle configured to send a wakeup signal on an unlicensed band may also be unfixed, and the first-cycle determination rule configured to obtain the first cycle may be preset in the base station. The base station, when successfully occupying an unlicensed band and required to send a wakeup signal on the unlicensed band, may acquire the first cycle according to the first-cycle determination rule.

For example, the first-cycle determination rule may include a mapping rule between a length of a band occupation time period and the first cycle. The base station, when required to acquire the first cycle, may acquire the first cycle based on the length of the band occupation time period and the mapping rule between the length of the band occupation time period and the first cycle. The band occupation time period is a present time period during which the base station occupies the unlicensed band.

Or, the first-cycle determination rule may also include a mapping rule between another parameter and the first cycle. For example, the first-cycle determination rule may include a mapping rule between the number of presently accessing terminals and the first cycle and a mapping rule between a service type supported by a presently accessing terminal and the first cycle, etc. The first-cycle determination rule is not limited in the embodiment of the present disclosure.

Optionally, the base station may further send first-cycle indication information to a terminal, the first-cycle indication information including the first cycle, or, the first-cycle indication information including the first-cycle determination rule. Correspondingly, the terminal may receive the first-cycle indication information from the base station.

For making it convenient for the terminal to receive the wakeup signal from the base station, in the embodiment of the present disclosure, the base station may send the first-cycle indication information to the accessing terminal to configure the first cycle or the first-cycle determination rule in the terminal.

For example, the base station may send the first-cycle indication information to the terminal through Radio Resource Control (RRC) signaling, a Media Access Control Control Element (MAC CE) or PHY signaling after successful access of the terminal.

Optionally, when the first-cycle determination rule includes the mapping rule between the length of the band occupation time period and the first cycle and the first-cycle indication information includes the first-cycle determination rule, the base station may send the length of the band occupation time period to the terminal through the unlicensed band in the band occupation time period, and correspondingly, the terminal may receive the length of the band occupation time period through the unlicensed band in the band occupation time period.

For example, the base station may send the length of the band occupation time period to the terminal through a PDCCH on the unlicensed band in the band occupation time period.

Optionally, in another possible implementation, the first cycle or the first-cycle determination rule may also be preset in the terminal and is not required to be additionally indicated by the base station.

In Step 1004, the base station sends, in a band occupation time period, a wakeup signal to a terminal through the unlicensed band at a plurality of first-time points in the band occupation time period according to the first cycle, and correspondingly, the terminal receives the wakeup signal from the base station on the unlicensed band according to the first cycle.

The wakeup signal is configured to trigger the terminal to monitor downlink control signaling or downlink data on the unlicensed band.

In the embodiment of the present disclosure, a base station, after successfully occupying an unlicensed band, may send a wakeup signal on an unlicensed band according to a first cycle rather than send the wakeup signal on the unlicensed band only at a starting moment of the band occupation time period. Correspondingly, the terminal may acquire the first cycle and receive the wakeup signal on the unlicensed band according to the first cycle. In such a case, there may be many opportunities of receiving the wakeup signal in a time period during which the unlicensed band is occupied.

A manner the terminal acquires the first cycle is similar to the manner the base station acquires the first cycle, namely the terminal may acquire the preset first cycle or the terminal may acquire the first cycle according to the first-cycle determination rule.

Optionally, when the first-cycle determination rule includes the mapping rule between the length of the band occupation time period and the first cycle, the terminal may receive the length, sent by the base station through the unlicensed band in the band occupation time period, of the band occupation time period and acquire the first cycle based on the length of the band occupation time period and the mapping rule between the length of the band occupation time period and the first cycle. The terminal, after acquiring the first cycle, may monitor the wakeup signal on the unlicensed band according to the first cycle, namely the terminal may enter a sleep state and monitor a wakeup signal again at a next monitoring time point indicated by the first cycle in a case that there is no data to be transmitted and no other downlink message needed to be monitored every time after monitoring the wakeup signal, and the terminal is not needed to keep monitoring a wakeup signal, thereby saving power of the terminal.

Figure 11:
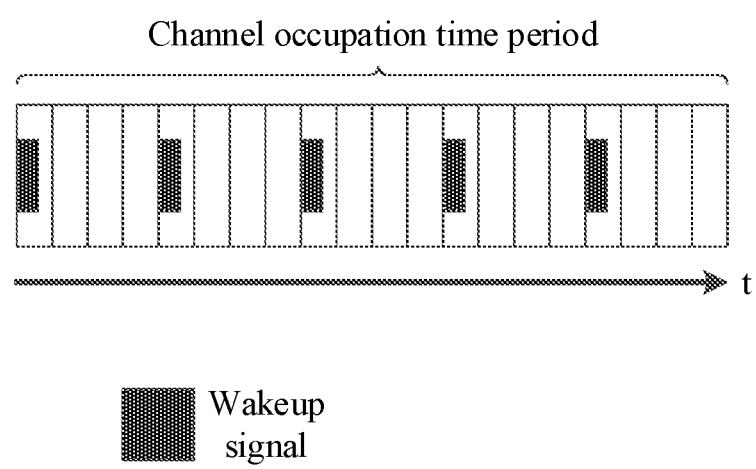
FIG. 11 is a schematic diagram of sending of a wakeup signal involved in the embodiment shown in FIG. 10.

Referring to FIG. 11, a schematic diagram of sending of a wakeup signal involved in the embodiment of the present application is shown. As shown in FIG. 11, the band occupation time period of the unlicensed band presently occupied by the base station includes 20 time-domain units, the length of the first cycle is 4 time-domain units, and the base station sends a wakeup signal on the time-domain units every four time-domain units in the present time period during which the unlicensed band is occupied. For example, in FIG. 11, the base station sends a wakeup signal on the time-domain units 1, 5, 9, 13 and 17 in the 20 time-domain units of the band occupation time period.

Step 1003 and Step 1004 are described with the condition that the base station sends a wakeup signal on the unlicensed band according to the first cycle as an example. In another possible implementation, the base station may also send a wakeup signal in other manner than periodic sending at a plurality of first-time points in the band occupation time period. For example, an interval between two adjacent time points when the base station sends a wakeup signal in the band occupation time period may gradually increase or gradually decrease.

In Step 1005, the terminal, after receiving the wakeup signal, monitors downlink control signaling or downlink data on the unlicensed band.

Through the solution in the embodiment of the present disclosure, the terminal, after receiving the wakeup signal periodically sent by the base station on the unlicensed band, may start monitoring the downlink control signaling or the downlink data on the unlicensed band.

For example, still taking FIG. 11 as an example, when the base station has no downlink data to be sent to terminal A before the time-domain unit 1 in the 20 time-domain units shown in FIG. 11, the terminal A may not receive the wakeup signal on the time-domain unit 1. In a case that downlink data required to be sent to the terminal A arrives at the base station on the time-domain unit 3 in the 20 time-domain units, the base station may send the wakeup signal to the terminal A on the time-domain unit 5, and correspondingly, the terminal A may receive the wakeup signal from the base station on the time-domain unit 5 and monitor downlink control signaling or downlink data sent by the base station, for example, monitoring whether there is a paging signal for the terminal A or not, on the unlicensed band.

From the above, according to the solution in the embodiment of the present disclosure, when a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service can be sent to the terminal only after the unlicensed band is successfully occupied next time is reduced, and furthermore, data transmission latency of the terminal is shortened.

Figure 12:
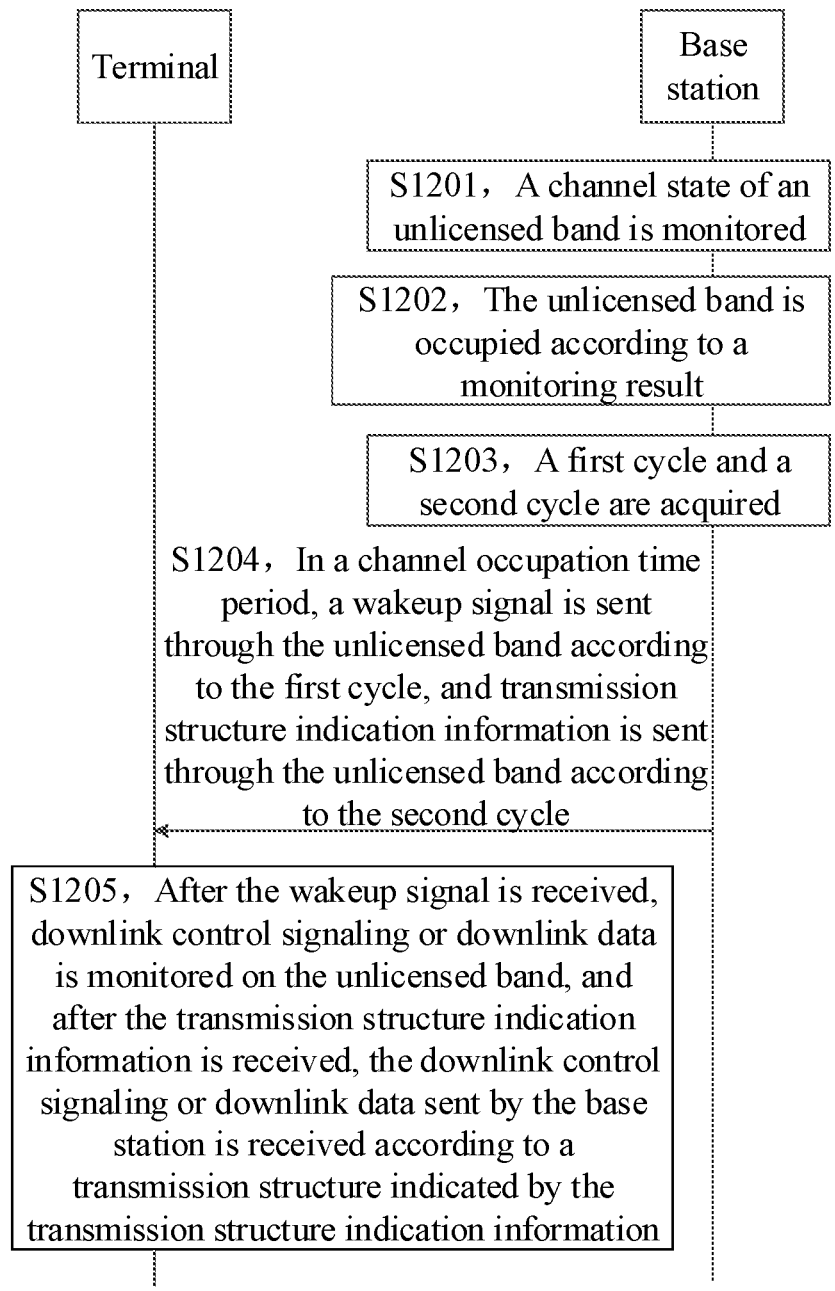
FIG. 12 is a flowchart of a terminal wakeup control method according to an exemplary embodiment.

FIG. 12 is a flowchart of a terminal wakeup control method according to an exemplary embodiment. As shown in FIG. 12, the terminal wakeup control method is applied to the wireless communication system shown in FIG. 4. The method may include the following steps.

In Step 1201, a base station monitors a channel state of an unlicensed band, the channel state including an idle state or an occupied state.

In Step 1202, the base station occupies the unlicensed band according to a monitoring result indicating that the unlicensed band is in the idle state.

A process that the base station monitors and occupies the unlicensed band may refer to the descriptions about Step 1201 and Step 1202 in the embodiment corresponding to FIG. 10 and will not be elaborated herein.

In Step 1203, the base station acquires a first cycle and a second cycle.

Optionally, when the second cycle is acquired, the base station may acquire the second cycle that is preset.

Or, when the second cycle is acquired, the base station may acquire the second cycle according to a preset second-cycle determination rule configured to acquire the second cycle.

Optionally, the second-cycle determination rule may include a mapping rule between a length of a band occupation time period and the second cycle. When the second cycle is acquired according to the preset second-cycle determination rule, the base station may acquire the second cycle based on the length of the band occupation time period and the mapping rule between the length of the band occupation time period and the second cycle.

Optionally, the base station may further send second-cycle indication information to a terminal, the second-cycle indication information including the second cycle, or, the second-cycle indication information including the second-cycle determination rule. Correspondingly, the terminal receives the second-cycle indication information.

Optionally, when the second-cycle indication information includes the second-cycle determination rule, the base station further may send the length of the band occupation time period to the terminal through the unlicensed band in the band occupation time period. Correspondingly, the terminal may receive the length, sent by the base station through the unlicensed band in the band occupation time period, of the band occupation time period.

A process that the base station acquires the second cycle is similar to the process of acquiring the first cycle, and a specific implementation process may refer to the contents about acquisition of the first cycle in the embodiment corresponding to FIG. 10 and will not be elaborated herein.

In Step 1204, the base station sends, in a band occupation time period, a wakeup signal to a terminal through the unlicensed band at a plurality of first-time points in the band occupation time period according to the first cycle and sends, in the band occupation time period, transmission structure indication information to the terminal through the unlicensed band at a plurality of second-time points in the band occupation time period according to the second cycle, and correspondingly, the terminal receives the wakeup signal from the base station on the unlicensed band according to the first cycle and receives the transmission structure indication information from the base station on the unlicensed band according to the second cycle.

Contents about the operations that the base station sends the wakeup signal to the terminal according to the first cycle and the terminal receives the wakeup signal according to the first cycle may refer to the descriptions about Step 1004 in the embodiment shown in FIG. 10 and will not be elaborated herein.

The transmission structure indication information is configured to indicate a transmission structure adopted for transmission on the unlicensed band. For example, the transmission structure may indicate specific time-domain intervals that may be configured for downlink transmission from the base station, specific time-domain intervals that may be configured for uplink transmission from the terminal and specific time-domain intervals that may not be configured for both downlink transmission from the base station and uplink transmission from the terminal on the unlicensed band in the present time period during which the unlicensed band is occupied.

For the terminal, when the transmission structure adopted by the base station on the unlicensed band in a time period during which the unlicensed band is occupied may be obtained, the power consumption may be effectively reduced when a downlink control signal or downlink data sent by the base station is subsequently received. For example, since the transmission structure may indicate a specific time-domain interval for downlink transmission from the base station, the terminal, when detecting the downlink control signal and/or downlink data of the base station, may perform signal detection and reception only in the time-domain interval indicated by the transmission structure and configured for downlink transmission from the base station, and keep a receiver off or not perform downlink signal detection and reception in a time-domain interval not configured for downlink transmission from the base station, and the receiver is not required to be kept active in the whole time period and is only kept on in a time period during which the base station may send the downlink signal, so that the power consumption of the terminal is reduced.

In related art, a base station may send transmission structure indication information on an unlicensed band at a starting moment of a time period during which the unlicensed band is occupied. In the embodiment of the present disclosure, the base station may periodically send the transmission structure indication information in the time period during which the unlicensed band is occupied, so that there are more opportunities for the terminal to learn about the transmission structure in remaining band occupation time.

A process that the base station sends transmission structure indication information to the terminal and the terminal receives the transmission structure indication information is similar to the process of transmitting a wakeup signal between the base station and the terminal and will not be elaborated herein.

Optionally, the transmission structure indication information is configured to indicate a target transmission structure in a preset transmission structure set, and the target transmission structure is at least one transmission structure in the transmission structure set.

In the embodiment of the present disclosure, the transmission structure indication information may be included in downlink control signaling for transmission. The transmission structure indication information may indicate one or more of transmission structures configured in pre-configured transmission structure configuration information.

In a possible implementation, the same configuration information may be adopted for transmission structure indication information transmitted at different times in a band occupation time period. In this implementation, a base station may notify a transmission structure information configuration set (corresponding to the transmission structure set) to a terminal through downlink control signaling, RRC signaling, a MAC CE or PHY signaling. The configuration set may include various transmission structures available to the base station. Or, the configuration set may also be a set predefined in the base station and the terminal. The transmission structure indication information transmitted at different times may indicate configuration information in different configuration information sets of the configuration set, and the configuration information is configured to indicate specific transmission structures to be adopted in the configuration set in a remaining present time period during which the unlicensed band is occupied or in a predefined time period. The configuration information may be set by the base station based on a service type.

Figure 13:
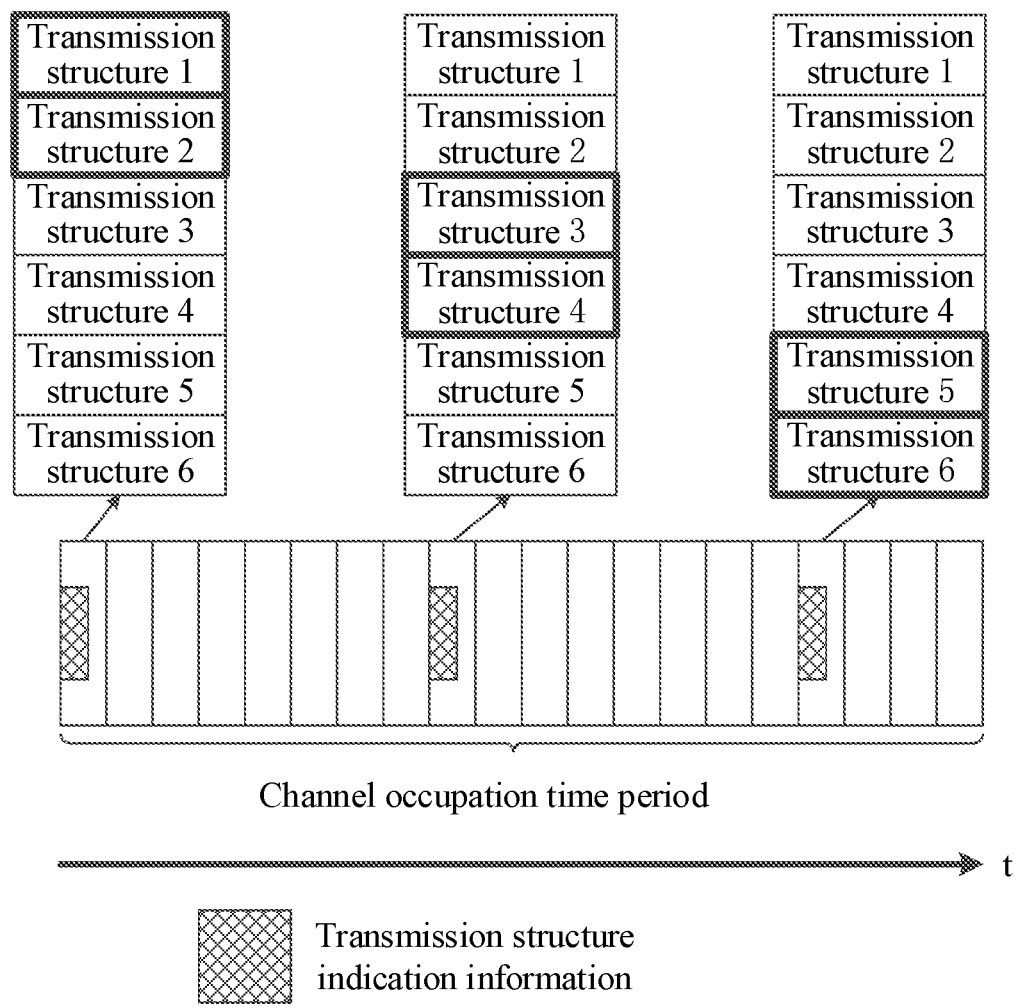
FIG. 13 is a schematic diagram of transmission structure indication involved in the embodiment shown in FIG. 12.

For example, referring to FIG. 13, a schematic diagram of transmission structure indication involved in the embodiment of the present application is shown. As shown in FIG. 13, the base station notifies a transmission structure information configuration set in advance, the configuration set includes 6 transmission structures (i.e., a transmission structure 1 to a transmission structure 6), and transmission structure indication information sent on different time points in a time period during which the unlicensed band is occupied indicates different configuration subsets in the transmission structure configuration set. For example, in FIG. 13, the transmission structure indication information sent for the first time may indicate the transmission structure 1 and transmission structure 2 in the transmission structure configuration set, which means the transmission structure 1 or the transmission structure 2 is adopted for uplink and downlink transmission on the unlicensed band in a subsequent present time period during which the unlicensed band is occupied. The transmission structure indication information sent on the second time point may indicate the transmission structure 3 and transmission structure 4 in the transmission structure configuration set, which means the transmission structure 3 or the transmission structure 4 is adopted for uplink and downlink transmission on the unlicensed band in the subsequent present time period during which the unlicensed band is occupied. The transmission structure indication information sent on the third time point may indicate the transmission structure 5 and transmission structure 6 in the transmission structure configuration set. Correspondingly, a length of an information field configured to contain the transmission structure indication information in the downlink control signaling containing the transmission structure indication information may change based on a size of the configuration subset (i.e., the number of the indicated transmission structures). For example, in the solution shown in FIG. 13, the transmission structure indication information may be carried only through a 1bit information field. Therefore, the number of bits occupied by the transmission structure indication information is reduced.

Or, the transmission structure indication information is configured to indicate a target transmission structure in a target transmission structure set, the target transmission structure set is one set in a plurality of preset transmission structure sets, and the target transmission structure is at least one transmission structure in the transmission structure set. That is, different configuration information may be adopted for transmission structure indication information transmitted at different times in a band occupation time period.

Figure 14:
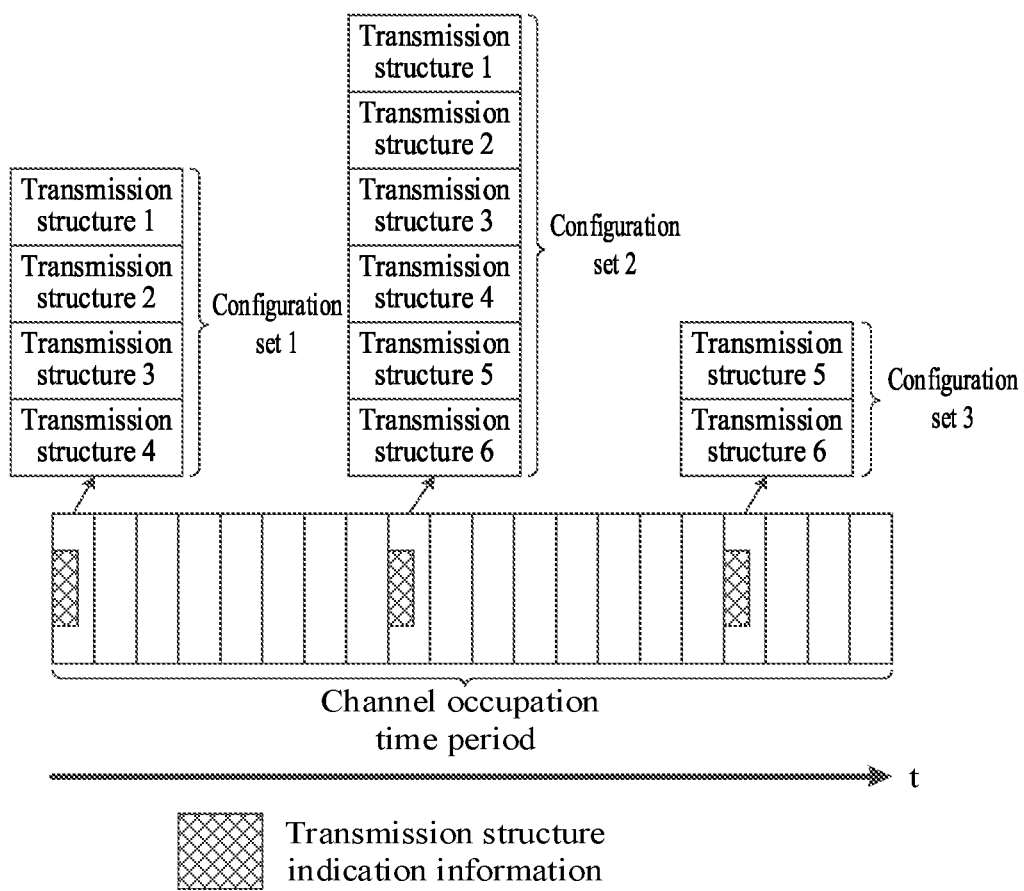
FIG. 14 is another schematic diagram of transmission structure indication involved in the embodiment shown in FIG. 12.

In a possible implementation, a base station may notify multiple transmission structure information configuration sets to a terminal in advance through downlink control signaling, and transmission structure indication information transmitted at different times may indicate different configuration sets. For example, referring to FIG. 14, another schematic diagram of transmission structure indication involved in the embodiment of the present disclosure is shown. As shown in FIG. 14, a base station pre-configures multiple transmission structure information configuration sets for a terminal, each configuration set includes at least one transmission structure, and transmission structure indication information sent on different time points in a time period during which the unlicensed band is occupied indicates one configuration set in these configuration sets. For example, in FIG. 14, the transmission structure indication information on the first time point indicates a configuration set 1 and a transmission structure 1, the configuration set 1 including transmission structures 1 to 4, which means that the transmission structure 1 in the configuration set 1 is adopted for uplink and downlink transmission on the unlicensed band in a subsequent present time period during which the unlicensed band is occupied. The transmission structure indication information sent on the second time point indicates a configuration set 2 and a transmission structure 2, the configuration set 2 including transmission structures 1 to 6, which means that the transmission structure 2 in the configuration set 2 is adopted for uplink and downlink transmission on the unlicensed band in the subsequent present time period during which the unlicensed band is occupied. By parity of reasoning, the transmission structure indication information sent on the third time point indicates a configuration set 3 and a transmission structure 5, the configuration set 3 including the transmission structures 5 and 6, which means that the transmission structure 5 in the configuration set 3 is adopted for uplink and downlink transmission on the unlicensed band in the subsequent present time period during which the unlicensed band is occupied.

Optionally, the first cycle may be the same as the second cycle.

Figure 15:
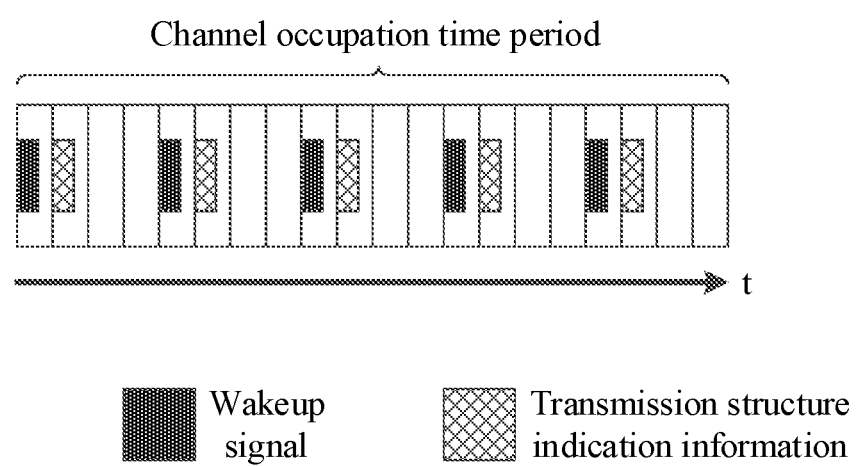
FIG. 15 is a schematic diagram of transmission of a wakeup signal and transmission structure indication information involved in the embodiment shown in FIG. 12.

For example, referring to FIG. 15, a schematic diagram of transmission of a wakeup signal and transmission structure indication information involved in the embodiment of the present disclosure is shown. As shown in FIG. 14, the band occupation time period of the unlicensed band presently occupied by the base station includes 20 time-domain units, lengths of both the first cycle (i.e., a sending period of the wakeup signal) and the second cycle (i.e., a sending period of the transmission structure indication information) are 4 time-domain units, and the base station sends a wakeup signal or transmission structure indication information on the time-domain units every four time-domain units in the present time period during which the unlicensed band is occupied. For example, in FIG. 15, a base station sends a wakeup signal on time-domain units 1, 5, 9, 13 and 17 in the 20 time-domain units of the band occupation time period and sends transmission structure indication information on time-domain units 2, 6, 10, 14 and 18 in the 20 time-domain units of the band occupation time period.

FIG. 15 is described with sending of a wakeup signal and transmission structure indication information on different time-domain units as an example. During a practical application, the wakeup signal and the transmission structure indication information may also be sent on the same time-domain unit. For example, a base station may send the wakeup signal and the transmission structure indication information at the same time on each time-domain unit in the time-domain units 1, 5, 9, 13 and 17.

Or, the first cycle may be different from the second cycle.

Figure 16:
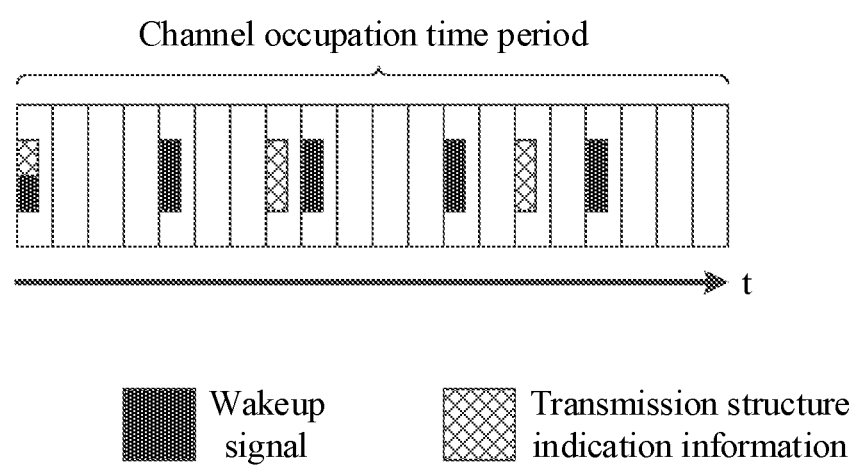
FIG. 16 is another schematic diagram of transmission of a wakeup signal and transmission structure indication information involved in the embodiment shown in FIG. 12.

For example, referring to FIG. 16, another schematic diagram of transmission of a wakeup signal and transmission structure indication information involved in the embodiment of the present disclosure is shown. As shown in FIG. 16, a band occupation time period of an unlicensed band presently occupied by a base station includes 20 time-domain units, the length of the first cycle (i.e., the sending period of a wakeup signal) is 4 time-domain units, the length of the second cycle (i.e., the sending period of transmission structure indication information) is 7 time-domain units, and in a present time period during which the unlicensed band is occupied, the base station sends the wakeup signal on the time-domain units every four time-domain units and sends the transmission structure indication information on the time-domain units every seven time-domain units. For example, in FIG. 16, the base station sends the wakeup signal on the time-domain units 1, 5, 9, 13 and 17 in the 20 time-domain units of the band occupation time period and sends the transmission structure indication information sent on the time-domain units 1, 8 and 15 in the 20 time-domain units of the band occupation time period.

Optionally, when the first cycle is the same as the second cycle, a resource spacing between the wakeup signal and the transmission structure indication information is a specified resource spacing. Correspondingly, the terminal, when receiving the wakeup signal, may receive the transmission structure indication information on the unlicensed band based on a resource position of the wakeup signal and the specified resource spacing.

The resource spacing may include at least one of a time-domain spacing and a frequency-domain spacing, namely the time-domain and/or frequency-domain spacing for transmission of the wakeup signal and the transmission structure indication information may be fixed. That is, resource spacings between the wakeup signal and transmission structure indication information periodically sent by the base station in multiple processes of occupying the unlicensed band are the same. For example, the base station may send the wakeup signal and the transmission structure indication information based on the fixed resource spacing in a process of occupying the unlicensed band or may also send the wakeup signal and the transmission structure indication information based on the fixed resource spacing in a next process of occupying the unlicensed band.

The fixed specified resource spacing may be set in a base station and a terminal in a predefinition manner, or, the base station may notify the fixed specified resource spacing to the terminal by signaling. The terminal, after detecting the wakeup signal, may receive the transmission structure indication information at a corresponding time-frequency position based on the specified resource spacing.

Step 1203 and Step 1204 are described with the condition that the base station sends the transmission structure indication information on the unlicensed band according to the second cycle as an example. In another possible implementation, the base station may send the transmission structure indication information in other manner than periodic sending at a plurality of second-time points in the band occupation time period. For example, an interval between two adjacent time points at which the base station sends the transmission structure indication information in the band occupation time period may gradually increase or gradually decrease.

In Step 1205, the terminal, after receiving the wakeup signal, monitors downlink control signaling or downlink data on the unlicensed band, and after receiving the transmission structure indication information, receives the downlink control signaling or downlink data from the base station in a time-domain interval corresponding to downlink transmission from the base station based on the transmission structure indicated by the transmission structure indication information.

From the above, according to the solution in the embodiment of the present disclosure, when a base station supports an unlicensed band, the base station, after successfully occupying the unlicensed band, may send a wakeup signal to a terminal through the unlicensed band at a plurality of first-time points in a present time period during which the unlicensed band is occupied, so that there are many opportunities for the base station to wake up the terminal in a process of occupying the unlicensed band, the situation that downlink data arriving in the process of occupying the unlicensed band and corresponding to a service can be sent to the terminal only after the unlicensed band is successfully occupied next time is reduced, and furthermore, data transmission latency of the terminal is shortened.

In addition, in the solution in the embodiment of the present disclosure, the base station, after successfully occupying the unlicensed band, may send transmission structure indication information to the terminal through the unlicensed band at the plurality of second-time points in the present time period during which the unlicensed band is occupied to indicate a time-domain interval corresponding to downlink transmission from the base station such that the terminal receives signaling or data from the base station in the time-domain interval corresponding to downlink transmission from the base station based on the transmission structure indication information. Therefore, the power consumption of the terminal is further reduced, and power of the terminal is saved.

The device embodiments of the present disclosure are set forth hereinafter, and may be configured to execute the method embodiments of the present disclosure. The details not disclosed in the device embodiments of the present disclosure may refer to the method embodiments of the present disclosure.

Figure 17:
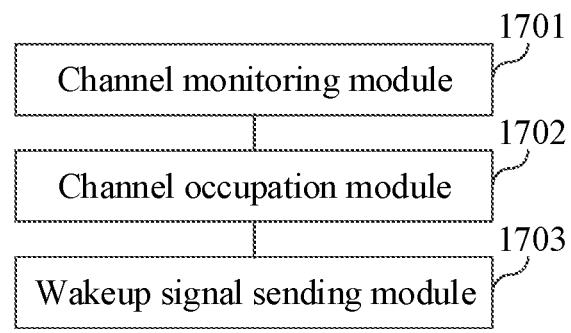
FIG. 17 is a block diagram of a terminal wakeup control device according to an exemplary embodiment.

FIG. 17 is a block diagram of a terminal wakeup control device according to an exemplary embodiment. As shown in FIG. 17, the terminal wakeup control device is implemented by a base station. For example, the terminal wakeup control device may be implemented into all or part of a base station in an implementation environment shown in FIG. 4 through hardware or a combination of software and hardware to implement the steps carried out by the base station in the embodiments shown in any one of FIG. 5, FIG. 6, FIG. 7, FIG. 10 or FIG. 12. The terminal wakeup control device may include:

a channel monitoring module 1701, configured to monitor a channel state of an unlicensed band, the channel state including an idle state or an occupied state;

a band occupation module 1702, configured to occupy the unlicensed band according to a monitoring result of the channel state of the unlicensed band; and a wakeup signal sending module 1703, configured to send a wakeup signal to a terminal through the unlicensed band at a plurality of first-time points in a band occupation time period, the band occupation time period being a present time period during which the unlicensed band is occupied and the wakeup signal being configured to trigger the terminal to monitor downlink control signaling or downlink data on the unlicensed band.

Optionally, the wakeup signal sending module 1703 is specifically configured to:

acquire a first cycle; and send the wakeup signal to the terminal through the unlicensed band at the plurality of first-time points in the band occupation time period according to the first cycle.

Optionally, when the first cycle is acquired, the wakeup signal sending module 1703 is specifically configured to:

acquire the first cycle that is preset; or, acquire the first cycle according to a preset first-cycle determination rule.

Optionally, the first-cycle determination rule may include a mapping rule between a length of the band occupation time period and the first cycle; and when the first cycle is acquired according to the preset first-cycle determination rule, the wakeup signal sending module 1703 is specifically configured to acquire the first cycle based on the length of the band occupation time period and the mapping rule between the length of the band occupation time period and the first cycle.

Optionally, the device further may include:

a first-cycle indication module, configured to send first-cycle indication information to the terminal, the first-cycle indication information including the first cycle, or, the first-cycle indication information including the first-cycle determination rule and the first-cycle determination rule being configured to acquire the first cycle.

Optionally, the first-cycle determination rule may include a mapping rule between a length of the band occupation time period and the first cycle.

The device further may include:

a first length sending module, configured to, when the first-cycle indication information includes the first-cycle determination rule, send the length of the band occupation time period to the terminal through the unlicensed band in the band occupation time period.

Optionally, the device further may include:

a transmission structure indication module, configured to send transmission structure indication information to the terminal through the unlicensed band at a plurality of second-time points in the band occupation time period, the transmission structure indication information being configured to indicate a transmission structure adopted for transmission on the unlicensed band.

Optionally, the transmission structure indication information is configured to indicate a target transmission structure in a preset transmission structure set, and the target transmission structure is at least one transmission structure in the transmission structure set;

or, the transmission structure indication information is configured to indicate a target transmission structure in a target transmission structure set, the target transmission structure set is one set in a plurality of preset transmission structure sets, and the target transmission structure is at least one transmission structure in the transmission structure set.

Optionally, the transmission structure indication module is specifically configured to:

acquire a second cycle; and send the transmission structure indication information to the terminal through the unlicensed band at the plurality of second-time points in the band occupation time period according to the second cycle.

Optionally, when the second cycle is acquired, the transmission structure indication module is specifically configured to:

acquire the second cycle that is preset; or, acquire the second cycle according to a preset second-cycle determination rule.

Optionally, the second-cycle determination rule may include a mapping rule between a length of the band occupation time period and the second cycle.

When the second cycle is acquired according to the preset second-cycle determination rule, the transmission structure indication module is specifically configured to:

acquire the second cycle based on the length of the band occupation time period and the mapping rule between the length of the band occupation time period and the second cycle.

Optionally, the device further may include:

a second cycle indication module, configured to send second-cycle indication information to the terminal, the second-cycle indication information including the second cycle, or, the second-cycle indication information including the second-cycle determination rule and the second-cycle determination rule being configured to acquire the second cycle.

Optionally, the second-cycle determination rule may include a mapping rule between a length of the band occupation time period and the second cycle.

The device further may include:

a second length sending module, configured to, when the second-cycle indication information includes the second-cycle determination rule, send the length of the band occupation time period to the terminal through the unlicensed band in the band occupation time period.

Optionally, the first cycle may be the same as the second cycle; or, the first cycle may be different from the second cycle.

Optionally, when the first cycle is the same as the second cycle, a resource spacing between the wakeup signal and the transmission structure indication information may be a specified resource spacing.

Figure 18:
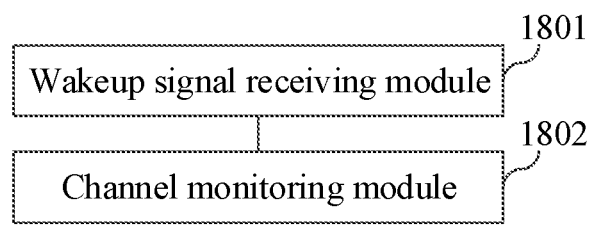
FIG. 18 is a block diagram of a terminal wakeup control device according to an exemplary embodiment.

FIG. 18 is a block diagram of a terminal wakeup control device according to an exemplary embodiment. As shown in FIG. 18, the terminal wakeup control device is implemented by a terminal. For example, the terminal wakeup control device may be implemented into all or part of a base station in an implementation environment shown in FIG. 4 through hardware or a combination of software and hardware to carry out the steps implemented by the terminal in the embodiment shown in any one of FIG. 5, FIG. 8, FIG. 9, FIG. 10 or FIG. 12. The terminal wakeup control device may include:

a wakeup signal receiving module 1801, configured to receive a wakeup signal from a base station on an unlicensed band, the wakeup signal being a signal sent by the base station at a plurality of first-time points in a band occupation time period after occupying the unlicensed band and the band occupation time period being a present time period during which the base station occupies the unlicensed band; and a channel monitoring module 1802, configured to, after the wakeup signal is received, monitor downlink control signaling or downlink data.

Optionally, the wakeup signal receiving module 1801 is specifically configured to:

acquire a first cycle; and receive the wakeup signal from the base station on the unlicensed band according to the first cycle.

Optionally, when the first cycle is acquired, the wakeup signal receiving module 1801 is specifically configured to:

acquire the preset first cycle; or, acquire the first cycle according to a preset first-cycle determination rule.

Optionally, the first-cycle determination rule may include a mapping rule between a length of the band occupation time period and the first cycle.

When the first cycle is acquired according to the preset first-cycle determination rule, the wakeup signal receiving module 1801 is specifically configured to:

receive the length, sent by the base station through the unlicensed band in the band occupation time period, of the band occupation time period, and acquire the first cycle based on the length of the band occupation time period and the mapping rule between the length of the band occupation time period and the first cycle.

Optionally, the device further may include:

a first-cycle indication receiving module, configured to, before the wakeup signal receiving module 1801 acquires the first cycle, receive first-cycle indication information from the base station, the first-cycle indication information including the first cycle, or, the first-cycle indication information including the first-cycle determination rule and the first-cycle determination rule being configured to acquire the first cycle.

Optionally, the device further may include:

a transmission structure indication receiving module, configured to receive, on the unlicensed band, transmission structure indication information sent by the base station at a plurality of second-time points in the band occupation time period, the transmission structure indication information being configured to indicate a transmission structure adopted for transmission on the unlicensed band; and a receiving module, configured to receive the downlink control signaling or downlink data from the base station in a time-domain interval corresponding to downlink transmission from the base station based on the transmission structure indicated by the transmission structure indication information.

Optionally, the transmission structure indication receiving module is specifically configured to:

acquire a second cycle; and receive the transmission structure indication information sent by the base station on the unlicensed band according to the second cycle.

Optionally, when the second cycle is acquired, the transmission structure indication receiving module is specifically configured to:

acquire the second cycle that is preset; or, acquire the second cycle according to a preset second-cycle determination rule.

Optionally, the second-cycle determination rule may include a mapping rule between a length of the band occupation time period and the second cycle.

When the second cycle is acquired according to the preset second-cycle determination rule, the transmission structure indication receiving module is specifically configured to:

receive the length, sent by the base station through the unlicensed band in the band occupation time period, of the band occupation time period, and acquire the second cycle based on the length of the band occupation time period and the mapping rule between the length of the band occupation time period and the second cycle.

Optionally, before the second cycle is acquired, the device further may include:

a second-cycle indication receiving module, configured to, before the transmission structure indication receiving module acquires the second cycle, receive second-cycle indication information from the base station, the second-cycle indication information including the second cycle, or, the second-cycle indication information including the second-cycle determination rule and the second-cycle determination rule being configured to acquire the second cycle.

Optionally, the first cycle may be the same as the second cycle; or, the first cycle may be different from the second cycle.

Optionally, when the first cycle is the same as the second cycle, a resource spacing between the wakeup signal and the transmission structure indication information may be a specified resource spacing.

The transmission structure indication receiving module is specifically configured to, when the wakeup signal is received, receive the transmission structure indication information on the unlicensed band based on a resource position of the wakeup signal and the specified resource spacing.

An exemplary embodiment of the present disclosure also provides a terminal wakeup control system, which includes a terminal and a base station.

The base station includes the terminal wakeup control device provided in the embodiment shown in FIG. 17.

The terminal includes the terminal wakeup control device provided in the embodiment shown in FIG. 18.

It is to be noted that when the devices provided by the above embodiments implement the functions, the division of the above function modules is merely for the example. In actual applications, the above functions may be completed by different function modules according to actual needs, i.e., the structure of the device is divided into different function modules to complete all or a part of the above-described functions.

With respect to the devices in the above embodiments, the specific manner for the operation implemented by each module has been described in detail in the embodiments related to the methods, and is not elaborated herein.

An exemplary embodiment of the present disclosure provides a terminal wakeup control device, which may implement all or part of the steps implemented by the base station in the embodiments shown in FIG. 5, FIG. 6, FIG. 7, FIG. 10 or FIG. 12. The terminal wakeup control device includes a processor and a memory configured to store instructions executable by the processor.

The processor is configured to:

monitor a channel state of an unlicensed band, the channel state including an idle state or an occupied state;

occupy the unlicensed band according to a monitoring result of the channel state of the unlicensed band; and send a wakeup signal to a terminal through the unlicensed band at a plurality of first-time points in a band occupation time period, the band occupation time period being a present time period during which the unlicensed band is occupied and the wakeup signal being configured to trigger the terminal to monitor downlink control signaling or downlink data on the unlicensed band.

An exemplary embodiment of the present disclosure provides a terminal wakeup control device, which may implement all or part of the steps implemented by the terminal in the embodiments shown in FIG. 5, FIG. 8, FIG. 9, FIG. 10 or FIG. 12. The terminal wakeup control device includes a processor and a memory configured to store instructions executable by the processor.

The processor is configured to:

receive a wakeup signal from a base station on an unlicensed band, the wakeup signal being a signal sent by the base station at a plurality of first-time points in a band occupation time period after occupying the unlicensed band and the band occupation time period being a present time period during which the base station occupies the unlicensed band; and after the wakeup signal is received, monitor downlink control signaling or downlink data.

The above mainly introduces the solutions provided by the embodiments of the present disclosure with the terminal and the base station as examples. It can be understood that, for the purpose of realizing the above functions, the terminal and the base station include a corresponding hardware structure and/or software module for executing each function. In combination with the modules and algorithm steps described in the embodiments disclosed in the present disclosure, the embodiments of the present disclosure may be implemented by hardware or a combination of the hardware and computer software. Whether a certain function is implemented in the form of hardware or in the form of computer software driving hardware depends on the specific applications and design constraint conditions of the technical solutions. Those skilled in the art may implement the described functions by using different methods for each specific application, but this implementation should not be considered beyond the scope of the present disclosure.

Figure 19:
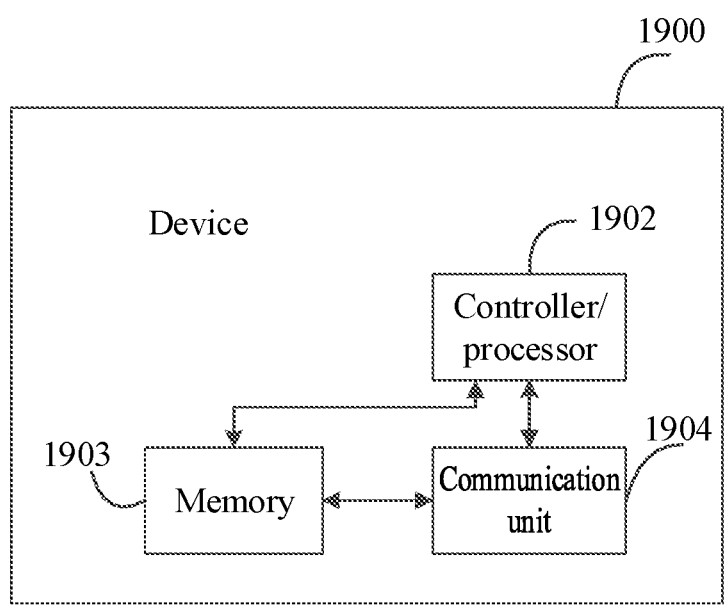
FIG. 19 is a structure diagram of a terminal wakeup control device according to an exemplary embodiment.

FIG. 19 is a structure diagram of a terminal wakeup control device according to an exemplary embodiment. The device 1900 may be implemented as the terminal or base station in each abovementioned embodiment.

The device 1900 includes a communication unit 1904 and a processor 1902. The processor 1902 may also be a controller, and is represented as "controller/processor 1902" in FIG. 19. The communication unit 1904 is configured to support communication between the terminal and another network device (for example, a base station).

Further, the device 1900 may further include a memory 1903. The memory 1903 is configured to store program codes and data of the terminal 1900.

It can be understood that FIG. 19 only shows a simplified design of the device 1900. During a practical application, the device 1900 may include any number of processors, controllers, memories, communication units and the like, and all terminals or base stations capable of implementing the embodiments of the present disclosure fall within the scope of protection of the embodiments of the present disclosure.

It is appreciated by those skilled in the art that the described functions in the embodiments of the present disclosure may be implemented by hardware, software, firmware or any combination thereof in the above one or more examples. When implemented by using the software, these functions may be stored in a computer-readable medium or transmitted as one or more instructions or codes on the computer-readable medium. The computer-readable medium may include a computer storage medium and a communication medium. The communication medium includes any medium that facilitates the transmission of a computer program from one place to another place. The storage medium may be any available medium that can be accessed by a universal or dedicated computer.

An embodiment of the present disclosure also provides a computer storage medium, configured to store a computer software instruction for the abovementioned terminal or base station, including a program designed to execute the abovementioned data transmission method.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A terminal wakeup control method, implemented by a terminal and comprising:

receiving a wakeup signal from a base station on an unlicensed band, wherein the wakeup signal is a signal sent by the base station at least two first-time points in a band occupation time period after the unlicensed band is occupied by the base station, and the band occupation time period is a present time period during which the unlicensed band is occupied by se station for transmissions;

receiving transmission structure indication information from the base station on the unlicensed band at at least two second-time points in the band occupation time period, wherein the transmission structure indication information is configured to indicate a transmission structure adopted for transmission on the unlicensed band;

after the wakeup signal is received, monitoring downlink control signaling or downlink data; and after the wakeup signal and the transmission structure indication information is received, receiving the downlink control signaling or downlink data from the base station in a time-domain interval corresponding to downlink transmission from the base station based on the transmission structure indicated by the transmission structure indication information, wherein the transmission structure indication information sent at the at least two second-time points respectively indicates a same pre-configured configuration set and at least one transmission structure comprised in the pre-configured configuration set; or, the transmission structure indication information sent at the at least two second-time points respectively indicates a different pre-configured configuration set and at least one transmission structure comprised the pre-configured configuration set, wherein receiving the wakeup signal from the base station on the unlicensed band comprises:

acquiring a first cycle; and receiving the wakeup signal from the base station on the unlicensed band according to the first cycle, wherein receiving the length, sent by the base station through the unlicensed band in the band occupation time period, of the band occupation time period, and acquiring the first cycle based on the length of the band occupation time period and the mapping rule between the length of the band occupation time period and the first cycle transmission structure indication information from the base station on the unlicensed band at least two second-time points in the band occupation time period comprises:

acquiring a second cycle; and receiving the transmission structure indication information from the base station on the unlicensed band according to the second cycle.

2. The method of claim 1, wherein acquiring the second cycle comprises:

acquiring the second cycle that is pre-configured; or, acquiring the second cycle according to a pre-configured second-cycle determination rule.

3. The method of claim 2, wherein the second-cycle determination rule comprises a mapping rule between a length of the band occupation time period and the second cycle;

acquiring the second cycle according to the pre-configured second-cycle determination rule comprises:

receiving the length, sent by the base station through the unlicensed band in the band occupation time period, of the band occupation time period, and acquiring the second cycle based on the length of the band occupation time period and the mapping rule between the length of the band occupation time period and the second cycle.

4. The method of claim 1, before acquiring the second cycle, further comprising:

receiving second-cycle indication information from the base station, the second-cycle indication information comprising the second cycle, or, the second-cycle indication information comprising a second-cycle determination rule and the second-cycle determination rule being configured to acquire the second cycle.

5. The method of claim 4, wherein, when the first cycle is the same as the second cycle, a resource spacing between the wakeup signal and the transmission structure indication information is a specified resource spacing;

receiving the transmission structure indication information from the base station, on the unlicensed band according to the second cycle at the at least two second-time points in the band occupation time period comprises:

when the wakeup signal is received, receiving the transmission structure indication information on the unlicensed band based on a resource position of the wakeup signal and the specified resource spacing.

6. A terminal wakeup control device, comprising:

a processor; and a memory configured to store instructions executable by the processor, wherein the processor is configured to:

receive a wakeup signal from a base station on an unlicensed band, wherein the wakeup signal is a signal sent by the base station at at least two first-time points in a band occupation time period after the unlicensed band is occupied by the base station, and the band occupation time period is a present time period during which the unlicensed band is occupied by the base station for transmissions;

receive transmission structure indication information from the base station on the unlicensed band at at least two second-time points in the band occupation time period, wherein the transmission structure indication information is configured to indicate a transmission structure adopted for transmission on the unlicensed band;

after the wakeup signal is received, monitor downlink control signaling or downlink data; and after the transmission structure indication information is received, receive the downlink control signaling or downlink data from the base station in a time-domain interval corresponding to downlink transmission from the base station based on the transmission structure indicated by the transmission structure indication information, wherein the transmission structure indication information sent at the at least two second-time points respectively indicates a same pre-configured configuration set and at least one transmission structure comprised in the pre-configured configuration set; or, the transmission structure indication information sent at the at least two second-time points respectively indicates a different pre-configured configuration set and at least one transmission structure comprised the pre-configured configuration set, wherein the processor is further configured to:

acquire a first cycle; and receive the wakeup signal from the base station on the unlicensed band according to the first cycle, wherein the processor is further configured to:

acquire a second cycle; and receive the transmission structure indication information from the base station on the unlicensed band according to the second cycle.

7. The device of claim 6, wherein, when the first cycle is acquired, the processor is configured to:

acquire the pre-configured first cycle; or, acquire the first cycle according to a pre-configured first-cycle determination rule.

8. The device of claim 7, wherein the first-cycle determination rule comprises a mapping rule between a length of the band occupation time period and the first cycle;

when the first cycle is acquired according to the pre-configured first-cycle determination rule, the wakeup signal receiving module is specifically configured to:

receive the length, sent by the base station through the unlicensed band in the band occupation time period, of the band occupation time period, and acquire the first cycle based on the length of the band occupation time period and the mapping rule between the length of the band occupation time period and the first cycle.

9. The device of claim 6, wherein the processor is further configured to:
- before acquiring the first cycle, receive first-cycle indication information from the base station, the first-cycle indication information comprising the first cycle, or, the first-cycle indication information comprising the first-cycle determination rule and the first-cycle determination rule being configured to acquire the first cycle.

10. The device of claim 6, wherein, when the first cycle is the same as the second cycle, a resource spacing between the wakeup signal and the transmission structure indication information is a specified resource spacing;
- the processor is configured to, when the wakeup signal is received, receive the transmission structure indication information on the unlicensed band based on a resource position of the wakeup signal and the specified resource spacing.

\* \* \* \* \*